US007219264B2

(12) United States Patent
Pail et al.

(10) Patent No.: US 7,219,264 B2
(45) Date of Patent: May 15, 2007

(54) METHODS AND SYSTEMS FOR PRESERVING DYNAMIC RANDOM ACCESS MEMORY CONTENTS RESPONSIVE TO HUNG PROCESSOR CONDITION

(75) Inventors: Michael R. Pail, Cary, NC (US); Robert Wallace, Apex, NC (US); Jeremy T. Baus, Raleigh, NC (US)

(73) Assignee: Tekelec, Morrisville, NC (US)

( * ) Notice: Subject to any disclaimer, the term of this patent is extended or adjusted under 35 U.S.C. 154(b) by 598 days.

(21) Appl. No.: 10/435,077

(22) Filed: May 9, 2003

(65) Prior Publication Data

US 2004/0225831 A1 Nov. 11, 2004

(51) Int. Cl.
*G06F 11/00* (2006.01)

(52) U.S. Cl. ............................. 714/23; 714/10; 714/55; 714/51; 711/106

(58) Field of Classification Search .................. 714/10, 714/55, 51, 23, 34; 711/106
See application file for complete search history.

(56) References Cited

U.S. PATENT DOCUMENTS

| 5,204,840 | A | * | 4/1993 | Mazur ......................... 365/228 |
|---|---|---|---|---|
| 5,513,319 | A | * | 4/1996 | Finch et al. .................. 714/55 |
| 6,012,154 | A | * | 1/2000 | Poisner ........................ 714/55 |
| 6,336,174 | B1 | * | 1/2002 | Li et al. ...................... 711/162 |
| 6,438,709 | B2 | * | 8/2002 | Poisner ........................ 714/23 |
| 6,467,007 | B1 | * | 10/2002 | Armstrong et al. .......... 710/260 |
| 6,697,973 | B1 | * | 2/2004 | Baumeister et al. .......... 714/55 |
| 6,829,677 | B1 | * | 12/2004 | Attaway et al. ............. 711/106 |
| 2006/0053350 | A1 | * | 3/2006 | Tsuyuno et al. .............. 714/55 |

OTHER PUBLICATIONS

Newton, Harry, Newton's Telecom Dictionary, Feb. 2002, 18th Ed., pp. 668-669.*

* cited by examiner

*Primary Examiner*—Robert W Beausoliel
*Assistant Examiner*—Christopher McCarthy
(74) *Attorney, Agent, or Firm*—Jenkins, Wilson, Taylor & Hunt, P.A.

(57) ABSTRACT

Methods and systems for preserving dynamic random access memory content in response to a hung processor condition are disclosed. In order to preserve dynamic random access memory content, a first watchdog timer is initiated and strobed at a predetermined time interval less than its timeout value. If a hung processor condition occurs and the strobing of the first watchdog timer fails, the first watchdog timer generates a non-maskable interrupt to the processor. The non-maskable interrupt triggers the processor to execute an interrupt service routine. If the processor is able to execute the interrupt service routine, the interrupt service routine controls the processor to perform a selective system reset and preserve dynamic random access memory contents. If the processor is not capable of executing the interrupt service routine, a board reset occurs and dynamic random access memory contents are cleared.

37 Claims, 3 Drawing Sheets

METHODS AND SYSTEMS FOR
PRESERVING DYNAMIC RANDOM ACCESS
MEMORY CONTENTS RESPONSIVE TO
HUNG PROCESSOR CONDITION

TECHNICAL FIELD

The present invention relates to methods and systems for preserving memory content. More particularly, the present invention relates to methods and systems for preserving dynamic random access memory content in response to a hung processor condition.

BACKGROUND ART

Two types of memory currently used in general purpose computer systems are static random access memory (SRAM) and dynamic random access memory (DRAM). Using static random access memory to store data is advantageous because static random access memory does not require periodic refresh signals in order to retain its contents. As a result, static random access memory contents can be preserved even when a computing system resets. One disadvantage to static random access memory is that it requires more transistors and therefore consumes more on-chip area per memory cell than dynamic random access memory. Dynamic random access memory is less expensive than and requires fewer transistors than static random access memory. However, dynamic random access memory requires a periodic refresh signal for the memory to retain its content. If an interruption occurs in the refresh signal, memory contents will be lost or corrupted.

In light of the cost and size advantages of dynamic random access memory, some microprocessors and their associated memory management and I/O controller chip sets are configured only to support dynamic random access memory. For example, the chip sets associated with the Intel Pentium® and Xeon® families of processors are configured to work only with dynamic random access memory. As a result, if the refresh signal from the memory management unit is interrupted, the contents of dynamic random access memory will be lost with these processor types.

One particular example where dynamic random access memory contents may be lost occurs when a processor hangs, the system resets, the memory management unit (MMU) is reinitialized and therefore memory contents are cleared. A hung processor condition may result from the processor executing a sequence of instructions that results in an infinite loop. If such a situation occurs, the processor may become incapable of performing any operations. When this occurs, a system or board reset is usually performed to restart the processor. When the processor restarts, one of the first operations usually performed by the processor is to initialize the MMU. Initialization of the MMU interrupts the refresh signal, thus corrupting the DRAM memory.

In some high performance computing applications, such as telephony computing applications, it may be desirable to preserve DRAM contents over system reset resulting from a hung processor condition. However, because the conventional solution is to corrupt, overwrite, or clear DRAM contents after reset in response to a hung processor condition, the cause of a hung processor condition may be difficult to determine.

Accordingly, there exists a long-felt need for improved methods and systems for detecting a hung processor condition and for preserving DRAM contents in response to the hung processor condition.

SUMMARY OF THE INVENTION

The present invention includes methods and systems for preserving dynamic memory content in response to a hung processor condition. According to the invention, a first watchdog timer is set to expire at a first interval if not reset within the interval. If the first watchdog timer expires, a hung processor condition is indicated, and a non-maskable interrupt is generated. As used herein, the term "non-maskable interrupt" or "NMI" refers to a signal that causes a processor to execute an interrupt service routine and that cannot be masked. The non-maskable interrupt triggers the processor to execute an interrupt service routine. The interrupt service routine instructs the processor to partially reset the card without resetting the MMU or clearing memory contents. The ISR may then store the contents in a safe location, such as an off-board memory location. Once the interrupt service routine has been successfully executed, a board reset may be performed to clear dynamic random access memory contents to assure operation from a known good starting point. In this manner, dynamic random access memory contents may be preserved when a hung processor condition occurs. In an alternate implementation, the interrupt service routine may control the processor to continue normal operations without performing a system reset. If normal operations are resumed, the ISR may preserve DRAM contents simply by allowing the MMU to continue the refresh signal. In other words, it may not be necessary to copy DRAM contents in order to preserve the contents for minor processor failures.

As used herein, the terms "selective system reset," "partial system reset," "selective board reset," and "partial board reset" refer to a reset that may be initiated by the interrupt service routine to reset some of the registers in the processor and associated chip set without clearing, overwriting, or corrupting DRAM contents. The terms "system reset" and "board reset" refer to a reset of all of the registers in a processor and associated chip set. After such a reset, DRAM contents are cleared.

According to another aspect of the invention, in response to expiration of the first watchdog timer, a second watchdog timer is initiated. If the processor is able to execute the interrupt service routine, the second watchdog timer is cleared to prevent its expiration. If the processor is unable to execute the interrupt service routine, the second watchdog timer expires, and a board reset occurs. Using two watchdog timers and a non-maskable interrupt to preserve memory content increases the likelihood that valuable diagnostic information will be retained in response to a hung processor condition. In addition, since large databases are often stored in DRAM memory, preserving DRAM contents can eliminate the need to reload such databases. The expiration of the second watchdog timer allows the processor to be restarted in the event that the memory contents cannot be preserved.

Retaining diagnostic information is especially important in telecommunications applications where processor failures may affect a service provider's ability to provide communications services to subscribers. To prevent future service interruptions, it is desirable that the service provider or equipment manufacturer be able to determine the cause of a processor failure. The present invention increases the likelihood of determining the cause of processor failures.

Accordingly, it is an object of the invention to provide improved methods and systems for preserving dynamic memory content in response to a hung processor condition.

An object of the invention having been stated hereinabove, and which is addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
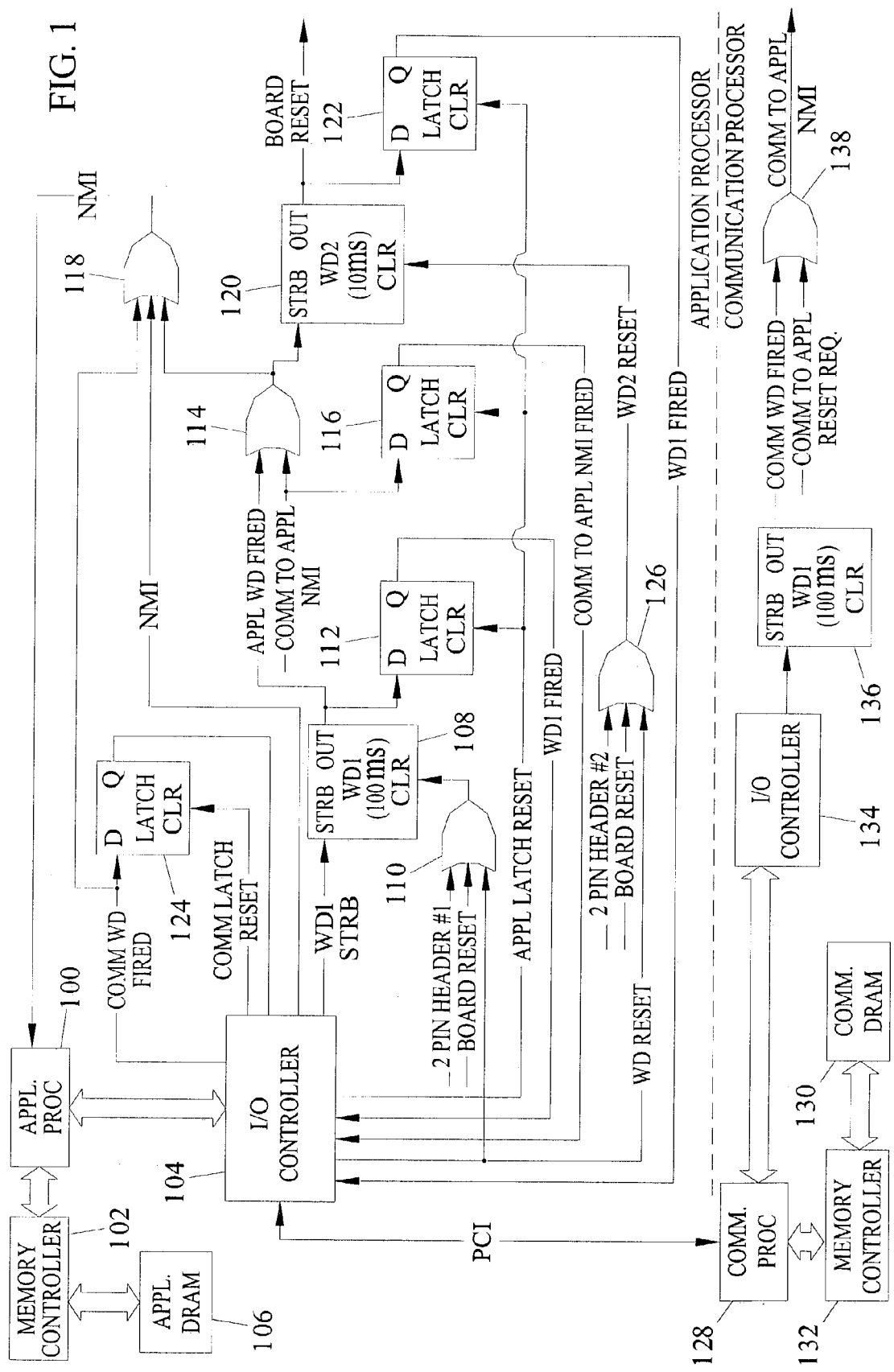
FIG. 1 is a logic diagram of a system for preserving dynamic random access memory content according to an embodiment of the present invention.

FIG. 1 illustrates a system for preserving dynamic random access memory content according to an embodiment of the present invention. Referring to FIG. 1, an application processor 100 is connected by a bus to a memory controller 102 and I/O controller 104. Memory controller 102 performs read and write operations to application DRAM 106. In one example, processor 100, memory controller 102, and I/O controller 104 may be implemented using an Intel processor and associated chip set. However, the present invention is not limited to preserving dynamic random access memory contents in systems that use Intel processors and chip sets. Preserving memory content in any system that uses dynamic random access memory and that has non-maskable interrupt capabilities is intended to be within the scope of the invention.

In order to preserve the contents of memory 106 in response to a hung condition of processor 100, a first watchdog timer 108 is coupled to I/O controller 104. First watchdog timer 108 includes a strobe input, a clear input, and an output. Watchdog timer 108 is preferably configured such that if a strobe signal is not present at the strobe input within predetermined time intervals, the output becomes high or active. In the example illustrated in FIG. 1, the time period is 100 milliseconds, and the strobe signal is supplied by I/O controller 104. During normal operation, application processor 100 preferably executes a program to control I/O controller 104 to generate an active strobe signal at an interval less than 100 ms. If the strobe signal is has not been presented within 100 ms, a hung processor condition may be indicated.

An OR gate 110 is connected to the clear input of watchdog timer 100. OR gate 110 ORs a board reset signal, a watchdog reset signal (WD RESET), and a signal PIN HEADER #1. The output of watchdog timer 108 is connected to a latch 112. Latch 112 is a D flip-flop that is designed to store the fact that the output of watchdog timer 108 becomes high. The output of watchdog timer 108 is also connected to another OR gate 114. OR gate 114 ORs the application watchdog fired signal (APPL WD FIRED) and communications to application processor non-maskable interrupt (COMM TO APPL NMI) signal. A second latch 116 latches the COMM TO APPL NMI signal.

The output of OR gate 114 is connected to another OR gate 118 and a second watchdog timer 120. OR gate 118 ORs the COMM WD FIRED, NMI, and APPL WD FIRED signals to produce a non-maskable interrupt to application processor 100. Conditions under which the non-maskable interrupt is generated will be described in detail below with regard to the method steps illustrated in FIG. 2. Watchdog timer 120 is strobed by the output from OR gate 114. If watchdog timer 120 is initiated by the output from OR gate 114 and is not strobed or cleared within a predetermined time interval, the output of watchdog timer 120 generates an active board reset signal. A latch 122 is coupled to the output of watchdog timer 120 to latch the board reset signal.

Additional logic in the application processor section of FIG. 1 includes a latch 124 to store a communications processor watchdog fired signal (COMM WD FIRED) and an OR gate 126 that ORs the watchdog reset, board reset, and 2 PIN HEADER #2 signals to clear watchdog timer 120. The 2 PIN HEADER #1 and #2 signals are used for diagnostic purposes so that the WD1 and WD2 STRB signals can be tested without resetting processor 100.

The lower half of FIG. 1 represents circuitry associated with a second processor 128 referred to herein as a communications processor. Communications processor 128 may include its own memory 130, memory controller 132, and I/O controller 134. In order to detect a hung condition of communications processor 128 and preserve memory contents, a watchdog timer 136 is connected to I/O controller 134. Watchdog timer 136 produces a communications watchdog fired signal (COMM WD FIRED) if the strobe signal from I/O controller 134 does not occur every 100 ms or less. An OR gate 138 receives the output from watchdog timer 136 and produces the COMM TO APPL NMI signal, which is input to OR gate 114.

Although FIG. 1 illustrates one example of a system for preserving dynamic random access memory content, the present invention is not limited to the circuitry illustrated in FIG. 1. It is understood that alternative logic for generating the NMI signal upon expiration of a predetermined time period relative to the DRAM refresh rate may be substituted for the circuitry illustrated in FIG. 1 without departing from the scope of the invention.

Figure 2:
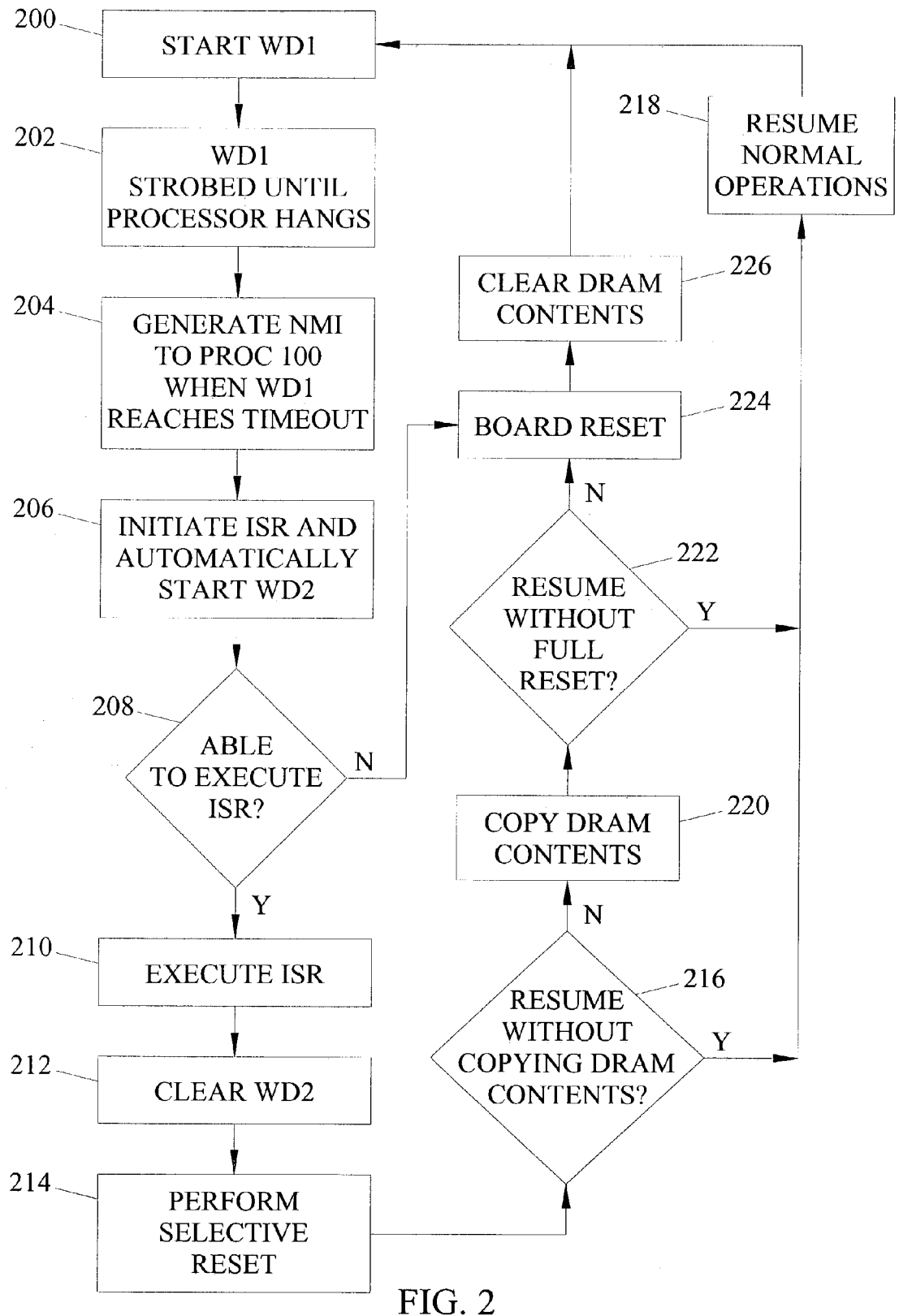
FIG. 2 is a flow chart illustrating exemplary steps that may be performed by the system illustrated in FIG. 1 for preserving dynamic random access memory content according to an embodiment of the present invention.

FIG. 2 is a flow chart illustrating exemplary steps for preserving dynamic random access memory contents using the system illustrated in FIG. 1 when a hung processor condition occurs. Referring to FIG. 2, in step 200, watchdog timer 108 is started in response to operation of application processor 100. In step 202, software executed by application processor 100 strobes watchdog timer 108. The strobe signal may be set to occur at a value less than the timeout interval of watchdog timer 108. The timeout interval of watchdog timer 108 may be set based on a performance tradeoff between the need to quickly detect a hung processor condition and processor cycles used in periodically generating the strobe signal. In one exemplary implementation, the timeout value for watchdog timer 108 may be set to 100 ms.

Step 202 occurs as long as processor 100 is operating under normal conditions. If processor 100 fails to instruct I/O controller 104 to generate the strobe signal, control proceeds to step 204 where a non-maskable interrupt is generated. In the example illustrated in FIG. 1, a non-maskable interrupt may occur when watchdog timer 108 reaches its timeout period of 100 milliseconds. This produces a high signal at the output of watchdog timer 108. The high output signal is input into OR gates 114 and 118 to produce a high non-maskable interrupt signal to application processor 100.

In response to the high non-maskable interrupt signal, in step 206, application processor 100 initiates an interrupt service routine. In addition, the high output signal at the output of watchdog timer 108 is input into watchdog timer 120 through OR gate 114. The high output signal starts watchdog timer 120. In step 208, if processor 100 is capable of executing the interrupt service routine, control proceeds to step 210 where processor 100 executes the ISR. In step 212, the ISR clears watchdog timer 120 to prevent watchdog timer 120 from expiring and producing a board reset signal. In step 214, the interrupt service routine controls processor 100 to perform a selective system reset. Performing a selective system reset may include resetting registers in application processor 100, memory controller 102, and I/O controller 104 to default values. However, such a reset preferably does not include clearing dynamic random access memory contents. In step 216, the interrupt service routine determines whether to resume normal operations of processor 100 without copying DRAM contents. For example, if DRAM stores a large database and processor 100 is capable of resuming normal operations, it may not be necessary to copy DRAM contents. If normal operations are possible, control proceeds to step 218 where normal operations of processor 100 are resumed and DRAM contents are preserved by resuming the refresh signal.

In step 216, if the ISR determines that it is desirable to copy DRAM contents, control proceeds to step 220 where the ISR takes steps to copy DRAM contents to a non-volatile memory location, such as an off-board memory location or a non-volatile on-board memory location. Examples of safe memory locations to which DRAM contents may be copied include flash memory devices and disk storage devices. Once DRAM contents have been copied, control proceeds to step 222 where the ISR determines whether to resume normal operations of processor 100 without a full or board reset. This determination may be based on the severity of the hung processor condition and whether it is desirable to ensure a restart from a known stable state. If it is determined that normal operations of processor 100 should be resumed without a board reset, control proceeds to step 218 where normal operations of processor 100 are resumed.

In step 222, if the ISR determines that a board reset is necessary, control proceeds to step 224 where a board reset is performed. Performing a board reset may be desirable in critical infrastructure telephony applications to ensure that a system restarts from a known stable state. After a board reset is performed, processor 100 may reinitialize memory controller 102. In step 226, memory controller 102 may clear, overwrite, or corrupt DRAM contents. Control may then return to step 200 where watchdog timer 108 is restarted. It should be noted that steps 224 and 226 may also be performed if processor 100 is incapable of executing the ISR is step 208. Thus, using the steps illustrated in FIG. 2, a non-maskable interrupt may be used to trigger a partial system reset, preservation of DRAM contents, and/or a board reset.

Figure 3:
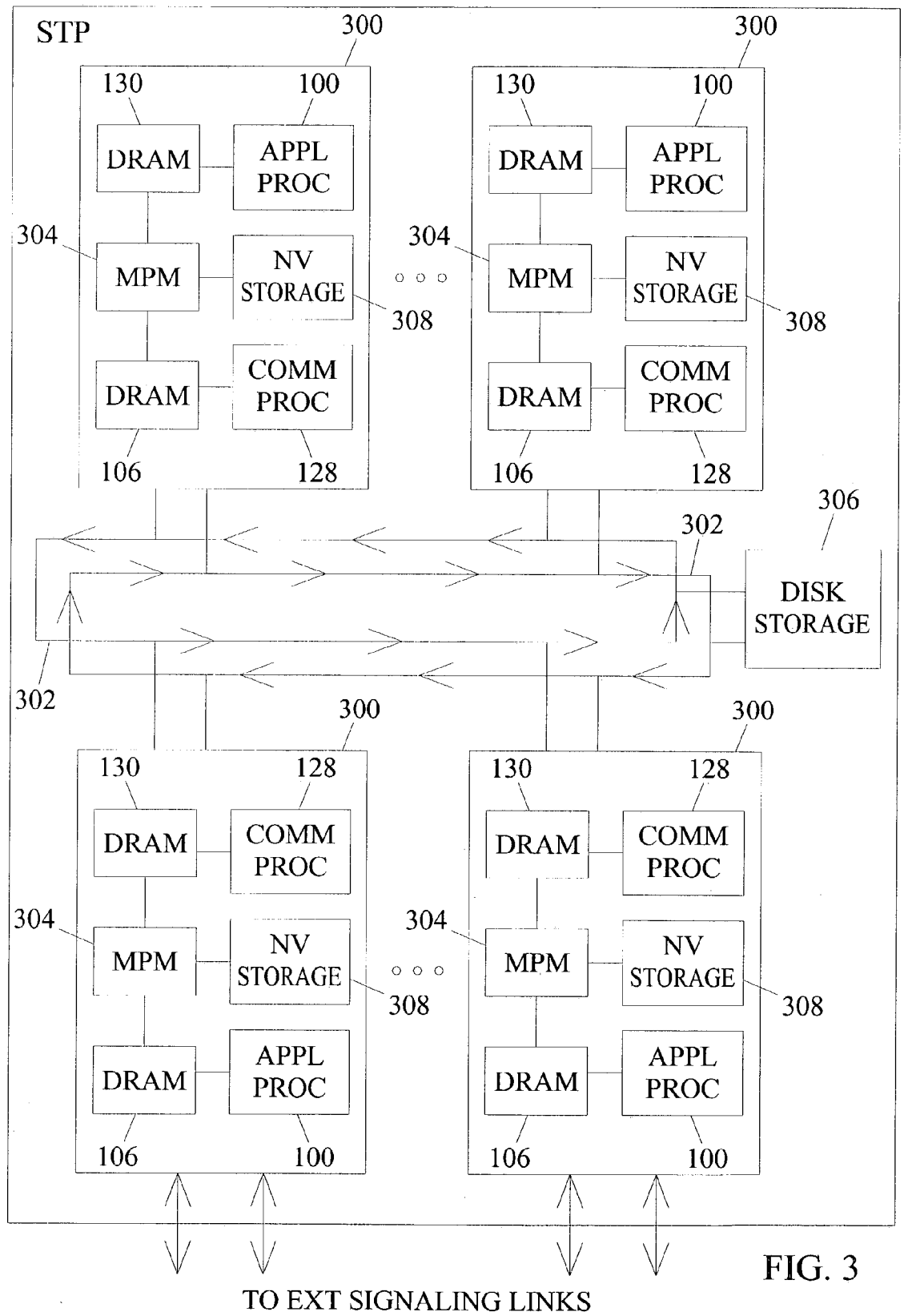
FIG. 3 is a block diagram of a distributed telecommunications processing system in which the methods and systems illustrated in FIGS. 1 and 2 may operate.

FIG. 3 illustrates an example of a critical infrastructure application for the circuitry and methods illustrated in FIGS. 1 and 2. Referring to FIG. 3, a plurality of printed circuit boards 300 are connected to each other via counter rotating dual ring buses 302. Each printed circuit board 300 includes an application processor 100 for performing telephony signaling functions, a communications processor 128 for communicating with other processors via buses 302, and dynamic random access memories 106 and 130 coupled to the respective processors. Printed circuit boards 300 may be components of a high-performance SS7 signal transfer point, such as the Eagle® signal transfer point available from Tekelec of Calabasas, Calif. Each printed circuit board 300 includes a memory preservation module 304 for preserving the contents of memories 106 and 130 in response to a hung processor condition. Memory preservation modules 304 may include circuitry such as that illustrated in FIG. 1 and perform the steps illustrated in FIG. 2 for preserving contents of memories 106 and 130. For example, when one of the application processors 100 or communication processors 128 fails, the associated memory preservation module 304 may perform a partial reset on the associated printed circuit board, and save the contents of the associated DRAM to a non-volatile memory location, such as disk storage 306. The contents of disk storage device 306 may be accessible by external diagnostic equipment in order to analyze card failures. Alternatively, memory preservation modules 304 may save DRAM contents to on-board nonvolatile memory devices 308.

Thus, the present invention includes methods and systems for preserving dynamic random access memory content in response to a hung processor condition. Such methods and systems are particularly useful for critical infrastructure applications, such as telephony signaling platforms. However, the present invention is not limited to use in telephony signaling platforms. The memory preservation functionality of the present invention may be used in any system in which a microprocessor uses dynamic random access memory and that has non-maskable interrupt capabilities.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for preserving dynamic random access memory contents in response to a hung processor condition, the method comprising:
    (a) starting a first watchdog timer that counts to a first timeout value and generates a first signal upon reaching the first timeout value;
    (b) controlling a processor being monitored to periodically reset the first watchdog timer at intervals less than the first timeout value;
    (c) in response to the first signal, generating a non-maskable interrupt to the processor; and
    (d) in response to the non-maskable interrupt, initiating the processor to execute an interrupt service routine (ISR) for performing a selective system reset and preserving dynamic random access memory contents, wherein performing a selective system reset includes resetting registers associated with the processor without clearing the dynamic random access memory contents.

2. The method of claim 1 wherein starting the first watchdog timer includes inputting a strobe signal to the first watchdog timer.

3. The system of claim 1 wherein controlling the processor to periodically reset the first watchdog timer includes periodically generating a strobe signal and inputting the strobe signal to the first watchdog timer.

4. The method of claim 1 wherein generating a non-maskable interrupt in response to the first signal includes inputting the first signal to a non-maskable interrupt input of the processor.

5. The method of claim 1 wherein preserving dynamic random access memory contents includes saving the dynamic random access memory contents to a non-volatile memory location.

6. The method of claim 5 wherein saving the dynamic random access memory contents to a non-volatile memory location includes saving the dynamic random access memory contents to a non-volatile memory location located on a different circuit board from the processor.

7. The method of claim 5 wherein saving the dynamic random access memory contents to a non-volatile memory location includes saving the dynamic random access memory contents to a non-volatile memory location on the same circuit board as the processor.

8. The method of claim 1 wherein preserving dynamic random access memory contents includes resuming a dynamic random access memory refresh signal.

9. The method of claim 1 comprising, in response to the non-maskable interrupt, starting a second watchdog timer for counting to a second timeout value and for generating a second signal in response to reaching the second timeout value and wherein the method further comprises performing a system reset and clearing dynamic random access memory contents in response to the second signal.

10. The method of claim 1 comprising, in response to the processor failing to successfully execute the interrupt service routine, performing a system reset and clearing the dynamic random access memory contents.

11. The method of claim 1 comprising, in response to the processor successfully executing the interrupt service routine, performing a system reset and clearing the dynamic random access memory contents.

12. The method of claim 11 comprising after resetting the processor, repeating steps (a)–(d).

13. A method for preserving dynamic random access memory contents in response to a hung processor condition, the method comprising:
  (a) starting a first watchdog timer that counts to a first timeout value and generates a first signal upon reaching the first timeout value;
  (b) controlling a processor being monitored to periodically reset the first watchdog timer at intervals less than the first timeout value;
  (c) in response to the first signal generating a non-maskable interrupt to the processor; and
  (d) in response to the non-maskable interrupt, initiating the processor to execute an interrupt service routine (ISR) for performing a selective system reset and preserving dynamic random access memory contents, in response to the non-maskable interrupt, starting a second watchdog timer for counting to a second timeout value and for generating a second signal in response to reaching the second timeout value and wherein the method further comprises performing a system reset and clearing dynamic random access memory contents in response to the second signal, and in response to successful initiation of the ISR, clearing the second watchdog timer.

14. A method for preserving dynamic random access memory contents in response to a hung processor condition, the method comprising:
  (a) starting a first watchdog timer that counts to a first timeout value and generates a first signal upon reaching the first timeout value;
  (b) controlling a processor being monitored to periodically reset the first watchdog timer at intervals less than the first timeout value;
  (c) in response to the first signal, generating a non-maskable interrupt to the processor; and
  (d) in response to the non-maskable interrupt, initiating the processor to execute an interrupt service routine (ISR) for performing a selective system reset and preserving dynamic random access memory contents, and after executing the ISR, resuming normal operations of the processor without performing a system reset.

15. A system for preserving dynamic random access memory contents responsive to a hung processor condition, the system comprising:
  (a) a processor for executing stored instructions;
  (b) dynamic random access memory operatively associated with the processor for storing instructions and data accessible by the processor;
  (c) a first watchdog timer operatively associated with the processor for counting to a first timeout value and generating a first signal upon reaching the first timeout value, wherein the processor is adapted to reset the first watchdog timer at intervals less than the first timeout value during normal operation of the processor; and
  (d) an interrupt service routine being executable by the processor in response to the first signal for controlling the processor to perform a selective system reset and to preserve dynamic random access memory contents, wherein the interrupt service routine is adapted to control the processor to reset I/O controller registers in response to the first signal without clearing dynamic random access memory contents.

16. The system of claim 15 wherein the processor is adapted to initiate the first watchdog timer by inputting a strobe signal to the first watchdog timer.

17. The system of claim 16 wherein the first watchdog timer is adapted to continuously count to the first timeout value after being initiated by the processor.

18. The system of claim 15 wherein the interrupt service routine is adapted to copy the dynamic random access memory contents to a non-volatile memory location after resetting the I/O controller registers.

19. The system of claim 18 wherein the non-volatile memory location includes a non-volatile memory location on a circuit board separate from a circuit board on which the processor is located.

20. The system of claim 18 wherein the non-volatile memory location comprises a memory location on the same circuit board as a circuit board on which the processor is located.

21. The system of claim 15 wherein the ISR is adapted to preserve DRAM contents by controlling the processor to resume a DRAM refresh signal.

22. The system of claim 15 comprising a second watchdog timer coupled to the first watchdog timer for initiating a count to a second timeout value responsive to the first signal and for generating a second signal upon reaching the second timeout value.

23. The system of claim 22 wherein, in response to failure of the interrupt service routine, the processor is adapted to perform a system reset and clear dynamic random access memory contents responsive to the second signal.

24. The system of claim 15 comprising, in response to completion of the interrupt service routine, the processor is adapted to perform a system reset and clear dynamic random access memory contents.

25. A system for preserving dynamic random access memory contents responsive to a hung processor condition, the system comprising:
  (a) a processor for executing stored instructions;
  (b) dynamic random access memory operatively associated with the processor for storing instructions and data accessible by the processor;

c) a first watchdog timer operatively associated with the processor for counting to a first timeout value and generating a first signal upon reaching the first timeout value, wherein the processor is adapted to reset the first watchdog timer at intervals less than the first timeout value during normal operation of the processor; and (d) an interrupt service routine being executable by the processor in response to the first signal for controlling the processor to perform a selective system reset and to preserve dynamic random access memory contents, comprising a second watchdog timer coupled to the first watchdog timer for initiating a count to a second timeout value responsive to the first signal and for generating a second signal upon reaching the second timeout value, wherein the interrupt service routine is adapted to clear the second watchdog timer.

26. A system for preserving dynamic random access memory contents responsive to a hung processor condition, the system comprising:

(a) a processor for executing stored instructions;

(b) dynamic random access memory operatively associated with the processor for storing instructions and data accessible by the processor;

(c) a first watchdog timer operatively associated with the processor for counting to a first timeout value and generating a first signal upon reaching the first timeout value, wherein the processor is adapted to reset the first watchdog timer at intervals less than the first timeout value during normal operation of the processor; and (d) an interrupt service routine being executable by the processor in response to the first signal for controlling the processor to perform a selective system reset and to preserve dynamic random access memory contents, wherein, in response to completion of the interrupt service routine, the processor is adapted to resume normal operation without clearing DRAM contents.

27. A distributed computing platform including memory preservation modules for preserving dynamic random access memory contents responsive to a hung processor condition, the platform comprising:

(a) a plurality of printed circuit boards being connected to each other via a bus;

(b) an application processor located on each of the printed circuit boards for executing stored instructions;

(c) dynamic random access memory located on each of the printed circuit boards for storing instructions and data accessible by the application processor on the respective printed circuit board; and (d) a memory preservation module coupled to the application processor and the dynamic random access memory on each of the printed circuit boards for controlling the application processor to perform a selective system reset and preserve dynamic random access memory contents in response to failure of the application processor, wherein the memory preservation module is adapted to control the application processor to reset its registers without clearing the dynamic random access memory contents in performing the selective system reset.

28. The platform of claim 27 wherein each memory preservation module includes a first watchdog timer for counting to a first timeout value and for generating a first signal upon reaching the first timeout value, wherein the application processor on each printed circuit board is adapted to reset the first watchdog timer during normal operation of the application processor and wherein the application processor is adapted to perform the selective system reset and preserve the dynamic random access memory contents in response to the first signal.

29. The platform of claim 28 wherein each memory preservation module includes a second watchdog timer coupled to the first watchdog timer and the application processor, wherein the second watchdog timer is activated in response to the first signal and is adapted to count to a second timeout value and to generate a second signal in response to reaching the second timeout value.

30. The platform of claim 29 wherein the application processor is adapted to perform a board reset and clear the dynamic random access memory contents in response to the second signal.

31. The platform of claim 27 wherein the application processor is adapted to copy the dynamic random access memory contents to a non-volatile memory location, and thereafter to perform a board reset and clear the dynamic random access memory contents.

32. The platform of claim 27 wherein the application processor is adapted to preserve dynamic random access memory contents by resuming a memory refresh signal.

33. The platform of claim 27 wherein elements (a)–(d) comprise components of a telecommunications signaling router.

34. The platform of claim 33 wherein the telecommunications signaling router comprises an SS7 signal transfer point.

35. The platform of claim 27 comprising a communications processor located on each printed circuit board for controlling communications over the bus.

36. The platform of claim 35 wherein the memory preservation module on each printed circuit board is adapted to preserve dynamic random access memory contents in response to a hung condition of the communications processor on the same printed circuit board.

37. A distributed computing platform including memory preservation modules for preserving dynamic random access memory contents responsive to a hung processor condition, the platform comprising:

(a) a plurality of printed circuit boards being connected to each other via a bus;

(b) an application processor located on each of the printed circuit boards for executing stored instructions;

(c) dynamic random access memory located on each of the printed circuit boards for storing instructions and data accessible by the application processor on the respective printed circuit board; and (d) a memory preservation module coupled to the application processor and the dynamic random access memory on each of the printed circuit boards for controlling the application processor to perform a selective system reset and preserve dynamic random access memory contents in response to failure of the application processor, wherein the memory preservation module is adapted to control the application processor to resume normal operation without performing a system reset.

* * * * *